INVENTOR.
THOMAS J. McQUEENEY
James R. Lindsey
ATTY.

United States Patent Office 3,325,214
Patented June 13, 1967

3,325,214
HEADREST
Thomas J. McQueeney, Shelton, Conn., assignor to The B. F. Goodrich Company, New York, N.Y., a corporation of New York
Filed July 25, 1966, Ser. No. 567,715
10 Claims. (Cl. 297—391)

ABSTRACT OF THE DISCLOSURE

A headrest particularly suitable for use in combination with aircraft seats and automobile seats. The headrest is comprised of a base member for providing dimensional stability to the structure, opposed resilient side members spaced from each other to provide a space therebetween, a resilient core member positioned in the space between the opposed side members, and a soft resilient support member overlying the core member for comfortably supporting the head. The core member is attached to the base member only along its rear marginal zone. The support member is attached to the base member along its front marginal portion, to the side members along their upper edges, and to the core member along its rear marginal zone. The central and forward portions of the core member are unattached to the components of the headrest which are adjacent to these portions of the core member.

---

This invention pertains to a headrest which provides exceptional comfort. The structure is particularly suitable for use in combination with aircraft seats and automobile seats, although it can be used also in other seating or as a pillow.

Various headrest constructions for use in combination with aircraft seating and automobile seating heretofore have been proposed and have met with varying degrees of commercial application. One such construction which has been employed merely consists of a headrest covering contoured to provide the desired exterior shape to the headrest and filled with conventional fiber upholstery padding or stuffing that consists of a random entanglement of animal hair or synthetic fibers. Unfortunately, the fibers of the fiber filler material tend to compact together after the head rest has been used for only a short period of time resulting in the loss of the desired degree of resiliency which is considered to be necessary in order to comfortably support the head. Also, the shorter fibers of the fiber filler material have a tendency to sift or filter to the bottom portion of the headrest as a consequence of vibration of the headrest when the automobile or aircraft in which the headrest is being employed is in motion and as a consequence of repeated compression and relaxation of the filler material when being used as a support for the head. The compacting of the fiber filler material and the sifting of the shorter fibers of the filler material to the bottom of the headrest results in the headrest becoming distorted from its desired contour and in the headrest not providing the desired degree of comfort cushioning for the head when being used for support. As a consequence, this type of construction has been considered not to be entirely satisfactory.

Another headrest construction which has been proposed and which has met with a degree of success involves the filling of a covering of the desired contour with a unitary loaf of cellular material such as polyurethane foam or latex foam rubber. While this latter construction is not subject to the above-mentioned deficiencies of a headrest filled with a fibrous filler material, it does not provide as comfortable a support for the head as desired.

The present invention provides a headrest cushion structure which is extremely comfortable and which is very light in weight, a feature which is highly desirable when the headrest is to be employed in an aircraft. In accordance with this invention, the headrest cushion structure is comprised of a base member for providing dimensional stability to the structure, opposed side members spaced from each other to provide an open space therebetween, a core member positioned in the open space between the said opposed side members and attached to the said base member only along its rear marginal zone, and a soft resilient support member which overlies the core member and is attached to the said base member along its front marginal portion, to the said side members along their upper edges, and to the said core member along its rear marginal zone. The recited components of the headrest desirably all are formed of a resilient cellular material with the supporting member for the head preferably being formed of a very low density, low compression latex foam rubber. The headrest cushion structure desirably is provided with a shock-absorbing member along the rear bottom margin thereof suitable for protecting a person seated in the seat behind the one with which the headrest is combined against injury in the event the person should strike his head against the headrest, it being understood that when the headrest is combined with a seat the base member then is positioned in a generally vertical position and rearwardly whereby the shock-absorbing member is positioned along the top rear margin of the seat.

The invention will be more fully understood from the following description of a specific embodiment of the invention and by referring to the accompanying drawing in which.

Figure 1:
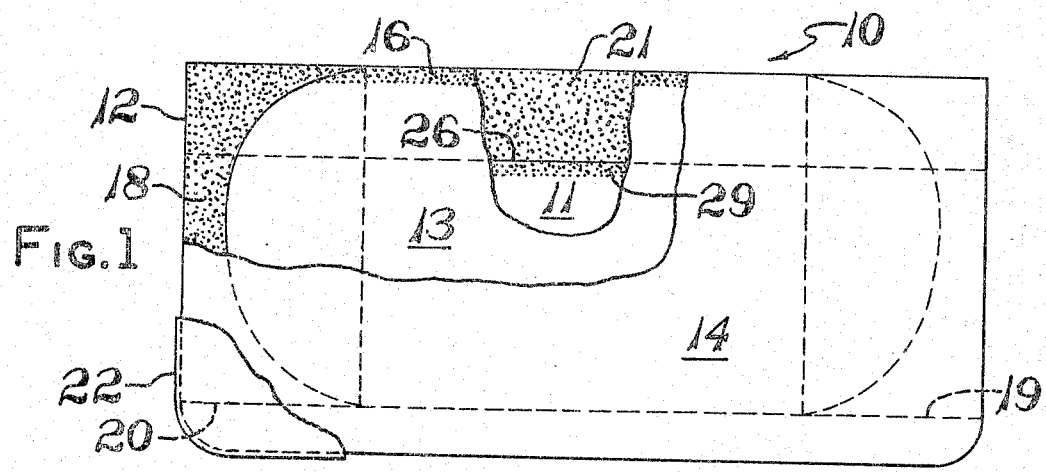
FIG. 1 is a plan view, partly broken away, of a headrest embodying this invention.

Referring to the drawing, the headrest cushion structure 10 is comprised of a base member 11, opposed side members 12, 12 spaced from each other to provide an open space therebetween, a core member 13 positioned in the said open space between the said opposed side members 12, 12, a support member 14 (for pillowing the head) overlying the core member 13, and a shock-absorbing member 21 disposed along the rear bottom corner of the structure 10. The headrest cushion structure 10 normally is encased in a covering 22 which conventionally is made of fabric or a flexible plastic material (such as vinyl chloride polymer upholstery material) and is contoured to the desired shape of the headrest and of a size to snugly fit over and cover the headrest cushion structure 10.

Figure 2:
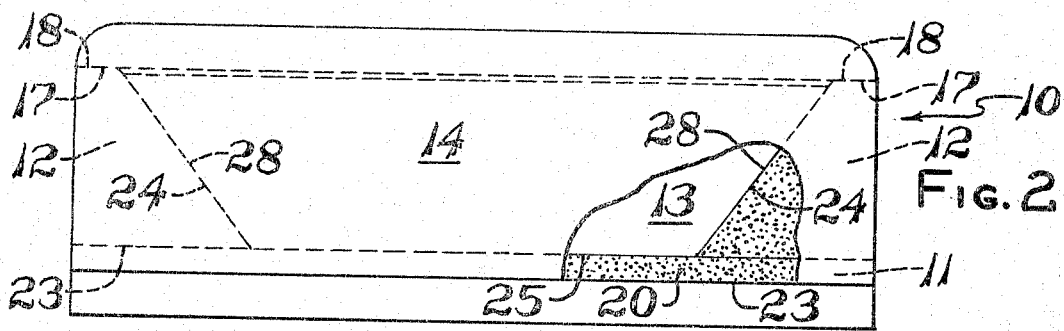
FIG. 2 is a front elevation, partly broken away, of the headrest cushion structure shown in FIG. 1.
Figure 3:
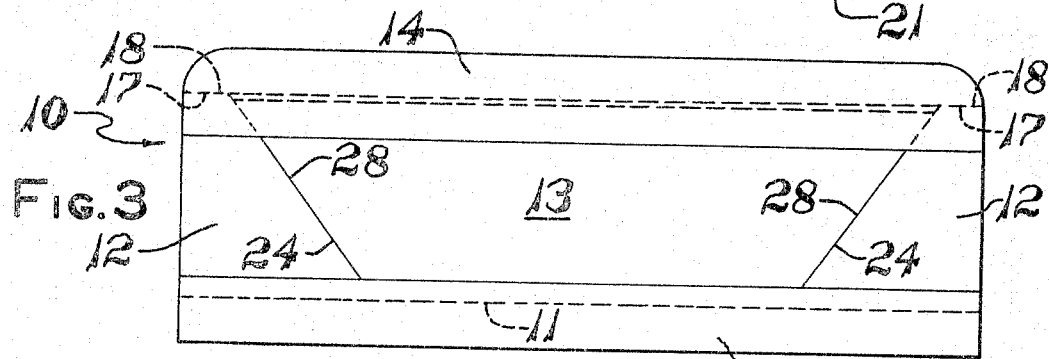
FIG. 3 is a rear elevation of the headrest cushion structure shown in FIG. 1.
Figure 4:
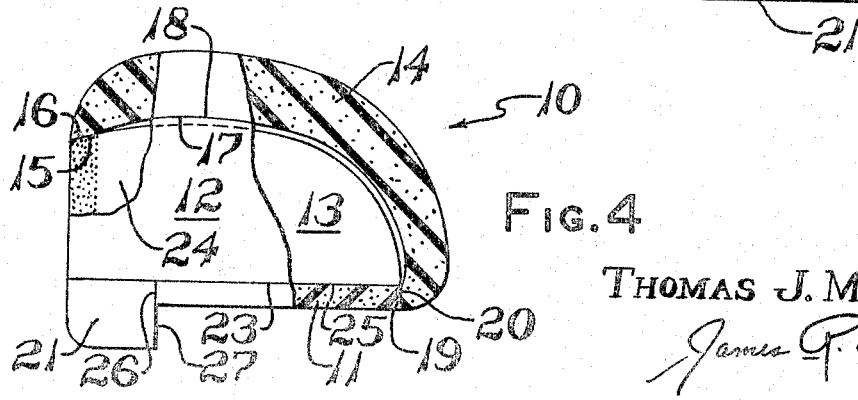
FIG. 4 is a side elevation, partly broken away and in section, of the headrest cushion structure shown in FIG. 1.

The support member 14 is adhered with a suitable adhesive along its lower rear marginal zone 15 to the upper rear marginal zone 16 of core member 13, along its lower side marginal zones 17, 17 to the upper faces 18, 18 of side members 12, 12 and along its front inner marginal zone 19 to the front edge 20 of base member 11. The side members 12, 12 of the cushion structure 10, in addition to being adhered to support member 14 in the manner indicated above, are adhered with a suitable adhesive along their bottom faces 23, 23 to base member 11 and to the surface areas of shock-absorbing member 21 which are in opposed juxtaposition with the bottom faces 23, 23 of side members 12, 12. The core member 13 is adhered to support member 14 only along the lower rear marginal zone 15 of support member 14 (as described above), to side members 12, 12 only along the rear marginal zones of the side faces 24 of core member 13, and along its bottom face 25 to the surface of shock-absorbing member 21 which is in opposed juxtaposition with the bottom face 25 of core member 13 and to the upper rear marginal zone 29 of said base member 11. The rear edge 26 of base member 11 is adhered with a suitable adhesive to the area of the front face 27 of shock-absorbing member 21 that is in opposed juxtaposition thereto. (The strippling on FIGS. 1 and 2 represent adhesive.)

It will be appreciated that the core member 13 in the headrest cushion structure 10 described above is attached to the remaining components of the structure 10 only along its rear marginal portion and that the surfaces of the core member 13 forward of the rear marginal portion of core member 13 (i.e. the central and forward portions of core member 13) remain unattached to the components of the structure 10 adjacent thereto whereby the central and forward portions of the core member 13 are free to move relative to the other components of the structure which construction provides a more comfortable cushioning support for the head when the headrest is in use than if the core member 13 were adhered throughout to the other components of the structure.

The support member 14 desirably is formed of a low density open-cell cellular material that also has a low compression resistance. Preferably, the support member 14 is formed of a latex foam rubber that has a density between 1.8 to 2.8 pounds per cubic foot and a compression resistance determined in accordance with the Indentation Test procedure set forth in A.S.T.M. designation D1055–59T of between 2.0 to 6.0 pounds when measured at 73° F. and in an air atmosphere having a 50 percent relative humidity. Desirably, the support member 14 is provided with small diameter corings that extend inwardly from both the top and bottom broadside faces of the layer of latex foam rubber or small diameter corings which extend through the entire thickness of the layer of latex foam rubber. Corings which have a diameter of from 1/16 to 1/4 inch are quite suitable. The corings impart additional "breathability" to the latex foam rubber.

The base member 11, side members 12, 12 and core member 13 desirably also are formed of a resilient cellular material, but, preferably, are formed of a cellular material which is firmer than the cellular material from which support member 14 is made. The base member 11 need not have a firmness the same as that of the side members 12, 12 and core member 13, nor do the side members 12, 12 need to have a firmness the same as that of core member 13. Desirably, however, base member 11, side members 12, 12 and core member 13 have densities which are within a range between 1.0 to 2.5 pounds per cubic foot and compression resistances determined in accordance with the Indentation test procedure set forth in A.S.T.M. designation D1055–59T which are within a range between 5 to 50 pounds when measured at 73° F. and in an air atmosphere having a 50 percent relative humidity. Open-cell resilient polyurethane foam has proven particularly satisfactory as the cellular material from which base member 11, side members 12, 12 and core member 13 are formed, although the use of other resilient cellular materials produces excellent results. It will be appreciated that the base member 11 need not even be resilient but may be formed of a rigid material without objectionably affecting the cushioning properties of the headrest.

The shock-absorbing member 21 may be formed of any resilient shock-absorbing material, although preferably it is made of a resilient closed-cell vinyl chloride polymer foam (such as a resilient closed-cell polyvinyl chloride foam material).

The opposing side faces 28, 28 of side members 12, 12 desirably are sloping and converge toward each other as they extend toward base member 11. Such construction forms a natural cradle between the opposed side members 12, 12 for maintaining a person's head comfortably supported in the central part of the headrest where optimum cushioning for the head is realized.

The headrest cushion structure 10 may be formed in any convenient manner such as by molding the various components to the desired shapes and adhering the components together as described. Alternately, the components may be cut to the desired shapes from larger pieces of material and the cut pieces assembled and adhered together in the manner described. A muslin covering may be disposed over the headrest cushion structure 10 before covering 22 is applied, if desired. The headrest cushion structure 10 is encased within the upholstery covering 22 in the conventional manner.

It will be appreciated that this invention is not intended to be restricted to the specific embodiment described above and that the shapes of the various components of the headrest can be varied from the specific shapes shown without departing from the scope of the invention as defined by the appended claims.

I claim:
1. A cushioning structure comprised of a base member, resilient opposed side members spaced from each other to provide an open space therebetween suitable for resting the head within, a resilient core member positioned in the said open space between said opposed side members, and a support member overlying said core member and being formed of a resilient open-cell cellular material, said support member being adhered along its lower rear marginal zone to the upper rear marginal zone of said core member, along its lower side marginal zones to the upper faces of said side members and along its front inner marginal zone to the front marginal portion of said base member, said side members being adhered along their bottom faces to said base member, said core member being adhered along the rear marginal zones of the side faces of said core member to said side members and along its bottom face to the upper rear marginal zone of said base member, the central and forward portions of said core member being unattached to said base member, side members and support member whereby the central and forward portions of the said core member are free to move relative to the other said components of the structure.

2. The cushioning structure of claim 1 in which said support member is formed of a resilient open-cell cellular material that has a density and a compression resistance which are lower than the densities and compression resistance of said base member, side members and core member.

3. The cushioning structure of claim 2 in which said support member is formed of a latex foam rubber which has a density between 1.8 to 2.8 pounds per cubic foot and a compression resistance determined in accordance with the Indentation test procedure set forth in A.S.T.M. designation D1055–59T of between 2.0 to 6.0 pounds when measured at 73° F. and in an air atmosphere having a 50 percent relative humidity.

4. The cushioning structure of claim 2 in which said base member, side members and core member are formed of resilient open-cell cellular materials.

5. The cushioning structure of claim 3 in which said base member, side members and core member are formed of resilient open-cell cellular materials which have densities between 1.0 to 2.5 pounds per cubic foot and compression resistances determined in accordance with the Indentation test procedures set forth in A.S.T.M. designation D1055–59T of between 5 to 50 pounds when measured at 73° F. and in an air atmosphere having a 50 percent relative humidity.

6. The cushioning structure of claim 1 in which the opposed side faces of said side members are sloping and converge toward each other as they extend toward the said base member.

7. The cushioning structure of claim 1 in which a resilient shock-absorbing member is adhered along the rear bottom corner of the structure.

8. The cushioning structure of claim 1 in which a covering member encases said base member, side members and core member.

9. The cushioning structure of claim 6 in which a covering member encases said base member, side members and core member.

10. The cushioning structure of claim 5 in which said base member, said side members and core member are formed of open-cell cellular materials which have densities between 1.0 to 2.5 pounds per cubic foot and compression resistances determined in accordance with the Indentation test set forth in A.S.T.M. designation D1055–59T of between 5 to 50 pounds when measured at 73° F. and in an air atmosphere having a 50 percent relative humidity and in which a resilient shock-absorbing member formed of a closed-cell vinyl chloride polymer cellular material is adhered along the rear bottom corner of the structure.

References Cited

UNITED STATES PATENTS

| | | | |
|---|---|---|---|
| 2,867,266 | 1/1959 | Vogler | 297—397 X |
| 2,883,681 | 4/1959 | Caplan | 5—341 |
| 3,205,005 | 9/1965 | Brown | 297—397 |
| 3,207,555 | 9/1965 | Kerr | 297—391 |
| 3,222,698 | 12/1965 | Levenson | 5—361 |
| 3,239,854 | 3/1966 | Freedlander | 5—337 |
| 3,271,072 | 9/1966 | Barker | 297—397 |

FOREIGN PATENTS

| | | |
|---|---|---|
| 926,720 | 5/1963 | Great Britain. |

CASMIR A. NUNBERG, *Primary Examiner.*